United States Patent
Sano

(10) Patent No.: US 9,017,865 B2
(45) Date of Patent: Apr. 28, 2015

(54) LITHIUM PRIMARY BATTERY AND METHOD OF PRODUCING SAME

(75) Inventor: Yoko Sano, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 67 days.

(21) Appl. No.: 13/808,234

(22) PCT Filed: Sep. 12, 2011

(86) PCT No.: PCT/JP2011/005113
§ 371 (c)(1),
(2), (4) Date: Feb. 11, 2013

(87) PCT Pub. No.: WO2012/042764
PCT Pub. Date: Apr. 5, 2012

(65) Prior Publication Data
US 2013/0266853 A1     Oct. 10, 2013

(30) Foreign Application Priority Data

Sep. 29, 2010   (JP) .................................. 2010-218928

(51) Int. Cl.
| | | |
|---|---|---|
| H01M 4/06 | (2006.01) | |
| H01M 4/50 | (2010.01) | |
| H01M 6/16 | (2006.01) | |
| H01M 2/16 | (2006.01) | |
| H01M 4/62 | (2006.01) | |
| H01M 4/583 | (2010.01) | |
| H01M 4/38 | (2006.01) | |
| H01M 4/587 | (2010.01) | |

(52) U.S. Cl.
CPC *H01M 4/50* (2013.01); *H01M 4/06* (2013.01); *H01M 6/16* (2013.01); *H01M 2/1673* (2013.01); *H01M 4/382* (2013.01); *H01M 4/502* (2013.01); *H01M 4/621* (2013.01); *H01M 4/625* (2013.01); *H01M 4/583* (2013.01); *H01M 4/587* (2013.01)

(58) Field of Classification Search
None
See application file for complete search history.

(56) References Cited

FOREIGN PATENT DOCUMENTS

| JP | 58-046574 A | 3/1983 |
|---|---|---|
| JP | 59-078465 A | 5/1984 |
| JP | 61-004167 A | 1/1986 |

(Continued)

OTHER PUBLICATIONS

Machine Translation of Japense Patent Publication No. 2009-140648 obtained from the Japanese Patent Office website on Jun. 10, 2014.*

(Continued)

*Primary Examiner* — Patrick Ryan
*Assistant Examiner* — Wyatt McConnell
(74) *Attorney, Agent, or Firm* — McDermott Will & Emery LLP

(57) ABSTRACT

The lithium primary battery comprises: a positive electrode; a negative electrode including lithium or a lithium alloy; a separator disposed between the positive electrode and the negative electrode; and a non-aqueous electrolyte. A surface of the negative electrode on a side of the carbon material layer has first ruggedness and adheres to a surface of the carbon material layer on a side of the negative electrode. A surface of the carbon material layer on a side of the separator has second ruggedness. The first ruggedness and the second ruggedness correspond to each other. The first ruggedness and the second ruggedness may be ruggedness formed by pressing the carbon material layer onto the surface of the negative electrode, thereby deforming the carbon material layer and the surface of the negative electrode.

18 Claims, 2 Drawing Sheets

(56) References Cited

FOREIGN PATENT DOCUMENTS

| | | |
|---|---|---|
| JP | 63-289768 A | 11/1988 |
| JP | 02-215043 A | 8/1990 |
| JP | 11-135116 A | 5/1999 |
| JP | 2007-220585 A | 8/2007 |
| JP | 2008-103129 A | 5/2008 |
| JP | 2009-099466 A | 5/2009 |
| JP | 2009-140648 A | 6/2009 |
| JP | 2010-086733 A | 4/2010 |
| JP | 2010-165498 A | 7/2010 |
| JP | 2010-212167 A | 9/2010 |

OTHER PUBLICATIONS

International Search Report issued in International Patent Application No. PCT/JP2011/005113 dated Dec. 6, 2011.

* cited by examiner

LITHIUM PRIMARY BATTERY AND METHOD OF PRODUCING SAME

RELATED APPLICATIONS

This application is the U.S. National Phase under 35 U.S.C. §371 of International Application No. PCT/JP2011/005113, filed on Sep. 12, 2011, which in turn claims the benefit of Japanese Application No. 2010-218928, filed on Sep. 29, 2010, the disclosures of which Applications are incorporated by reference herein.

TECHNICAL FIELD

The present invention relates to a lithium primary battery using a non-aqueous electrolyte, and particularly relates to an improvement of a surface of a negative electrode of the lithium primary battery.

BACKGROUND ART

Lithium primary batteries have been widely used in devices having a temperature of operating environment of about −20° C. to 60° C. based on human life range. In recent years, uses of devices using primary batteries have been increasing. In particular, primary batteries having high output have been demanded as the devices are having higher functions and becoming lightweight. For example, in active tags or keyless entry, a large current is required at the time of transmitting radio waves. In particular, primary batteries operating favorably in a low-temperature environment of about −20° C. have been demanded.

Lithium primary batteries include: a positive electrode including a positive electrode active material of a metal oxide such as manganese dioxide ($MnO_2$), graphite fluoride (($CF_x)_n$), iron sulfide ($FeS_2$), and thionyl chloride ($SOCl_2$); a negative electrode including lithium or a lithium alloy; a separator; and a non-aqueous electrolyte. In particular, lithium primary batteries using manganese dioxide as the positive electrode active material are widely known because of having favorable discharge characteristics, and moreover, manganese dioxide is a material that can be procured relatively easily.

On a surface of the negative electrode, active lithium reacts with components included in the non-aqueous electrolyte, thereby producing a gas or forming a coating film of a high-resistance (or insulating) component. Consequently, the battery reaction may be impaired, or the resistance of the battery may be increased, which may deteriorate discharge characteristics.

In a lithium primary battery using manganese dioxide or graphite fluoride as the positive electrode active material, a part of the active material dissolves in the non-aqueous electrolyte to produce manganese ions or fluorine ions in the battery. The resulting ions produce a high-resistance component by the reaction with the negative electrode, and a coating film of this component is formed on the surface of the negative electrode, which leads to an increase in the resistance of the battery.

In particular, when manganese dioxide is used as the positive electrode active material, the elution of manganese ions increases as the discharge progresses. Consequently, if the battery is stored in the condition of being discharged to some extent, a large amount of high-resistance component is produced on the surface of the negative electrode, which increases significantly the resistance of the negative electrode and the battery. Thus, when the use of the battery is resumed, the discharge characteristics decline significantly although the capacity of the battery remains. In particular, the large-current discharge characteristics and the pulse discharge characteristics at low temperatures decline considerably, and therefore the battery will not be able to be discharged at a large current.

In order to suppress the elution of the positive electrode active material and protect the surface of the negative electrode to suppress the formation of the high-resistance coating film, an additive to the non-aqueous electrolyte has been examined. However, the increase in the resistance on the surface of the negative electrode cannot be suppressed sufficiently, and therefore the realization of higher output in a low-temperature environment has not been satisfactory.

In order to suppress the reaction of the negative electrode with the components included in the non-aqueous electrolyte on the surface of the negative electrode, an arrangement of a layer using a carbon material on the surface of the negative electrode has been examined.

For example, in Patent Literature 1, in order to prevent the reaction between lithium and the electrolyte and to suppress the increase of inactive lithium, a carbonaceous powder adheres to a surface of metal lithium or a lithium alloy and is pressed with rollers to be integrated with the metal lithium or lithium alloy.

In Patent Literature 2, in order to suppress the reaction of the negative electrode with the electrolyte, a carbon material-including layer formed of a carbon material and a material holding the carbon material is disposed on the surface of the negative electrode.

In Patent Literature 3 relating to a secondary battery, a thin layer of a carbon material composed of an organic sintered compact is formed on a surface of the negative electrode by application, vapor deposition, or sputtering, etc. Thus, suppression of the production of lithium dendrites on the surface of the negative electrode is intended, thereby to improve the charge and discharge cycle life and the storage characteristics.

CITATION LIST

Patent Literature

[PTL 1] Japanese Laid-Open Patent Publication No. Hei 11-135116
[PTL 2] Japanese Laid-Open Patent Publication No. 2009-140648
[PTL 3] Japanese Laid-Open Patent Publication No. Hei 2-215043

SUMMARY OF INVENTION

Technical Problem

When a carbon material layer is formed on the surface of the negative electrode of lithium, etc., the negative electrode is protected with the carbon material layer, thereby suppressing the formation of a high-resistance coating film on the surface of the negative electrode. Meanwhile, a stable low-resistance coating film is formed on a surface of the carbon material. As a result, the decline in the discharge characteristics can be suppressed to some extent.

However, in Patent Literature 1, it is necessary to form the negative electrode by cutting or perforating sheet-shaped lithium to which a carbonaceous powder is pressure bonded. In this case, the carbonaceous powder separates at the time of cutting or assembly of the battery. The surface of the negative electrode is exposed at the portion where the carbonaceous powder has separated, and the formation of a high-resistance coating film cannot be suppressed effectively. Therefore, the discharge characteristics are deteriorated. In order to prevent this, in a coin type battery, it is considered to pressure bond a disk-shaped lithium negative electrode to a sealing plate, and subsequently pressure bond a carbonaceous powder to the surface of the lithium negative electrode.

However, it is technically difficult to pressure bond effectively a carbonaceous powder to a disk-shaped lithium negative electrode having a limited surface area. The carbonaceous powder is likely to aggregate, and it is difficult to form a layer having a uniform density distribution. Further, a dry atmosphere is required at the time of assembling a battery. In order to handle the carbonaceous powder in such an atmosphere, measures against scattering, etc. are necessary, which makes the process complicated.

In Patent Literature 2, since pressure is applied to each constituent in the battery at the time of assembling the battery, the carbon material-including layer adheres to the surface of the negative electrode to some extent. Consequently, the reaction of the negative electrode with the non-aqueous electrolyte, and the reaction of manganese ions or fluorine ions dissolving from the positive electrode with the negative electrode can be suppressed to some extent before the discharge. However, as the discharge progresses, the pressure applied to each constituent in the battery is decreased, and adhesiveness between the carbon material-including layer and the negative electrode is decreased, thereby to produce unevenness in the contact state. As a result, the large-current discharge characteristics and the pulse discharge characteristics at low temperatures cannot be improved stably.

In Patent Literature 3, when the thin layer is formed by vapor deposition or sputtering, the adhesiveness to the negative electrode can be ensured to some extent. However, in the lithium primary battery, since such a thin film suppresses transfer of lithium ions during the discharge, the large-current discharge characteristics cannot be improved.

Solution to Problem

An object of the present invention is to provide a lithium primary battery having excellent large-current discharge characteristics in a low-temperature environment not only at an initial period but also after the progress of the discharge.

An aspect of the present invention relates to a lithium primary battery comprising: a positive electrode; a negative electrode including lithium or a lithium alloy; a separator disposed between the positive electrode and the negative electrode; a carbon material layer interposed between the negative electrode and the separator; and a non-aqueous electrolyte, a surface of the negative electrode on a side of the carbon material layer having first ruggedness and adhering to a surface of the carbon material layer on a side of the negative electrode, a surface of the carbon material layer on a side of the separator having second ruggedness, and the first ruggedness and the second ruggedness corresponding to each other.

Another aspect of the present invention relates to a method of producing a lithium primary battery comprising: a positive electrode; a negative electrode including lithium or a lithium alloy; a separator disposed between the positive electrode and the negative electrode; a carbon material layer interposed between the negative electrode and the separator; and a non-aqueous electrolyte, the method comprising: a first step of disposing the carbon material layer on a surface of the negative electrode on a side of the separator; and a second step of pressing a surface having ruggedness, of a pressing tool onto the surface of the negative electrode with the carbon material layer interposed therebetween, thereby forming first ruggedness and second ruggedness corresponding to the ruggedness of the pressing tool, respectively, on the surface of the negative electrode and the surface of the carbon material layer on the side of the separator, and allowing the carbon material layer to adhere to the surface of the negative electrode.

Advantageous Effects of Invention

According to the present invention, the surface of the negative electrode has the first ruggedness, the surface of the carbon material layer on the side of the separator has the second ruggedness, and the first ruggedness and the second ruggedness correspond to each other. Consequently, the adhesiveness between the negative electrode and the carbon material layer is high and the carbon material layer has a uniform thickness. The high adhesiveness between the negative electrode and the carbon material layer is maintained even after the progress of the discharge, and the increase in the resistance of the negative electrode can be suppressed. Therefore, excellent large-current discharge characteristics and pulse discharge characteristics can be obtained not only at an initial period of the discharge but also after the progress of the discharge.

The carbon material layer can suppress effectively the reaction of the negative electrode with components included in the non-aqueous electrolyte (e.g., a component originating from positive electrode active material, a non-aqueous solvent), and it can suppress the formation of a high-resistance (or insulating) coating film on the surface of the negative electrode.

Also, due to the contact of the carbon material layer with the non-aqueous electrolyte, a low-resistance coating film is formed on the surface of the carbon material (or carbon material layer), while the carbon material layer absorbs a part of lithium of the negative electrode. Consequently, high electron conductivity and ion conductivity can be ensured on the surface of the negative electrode, and the increase in the resistance of the negative electrode can be prevented effectively at an initial period.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENT

Figure 1:
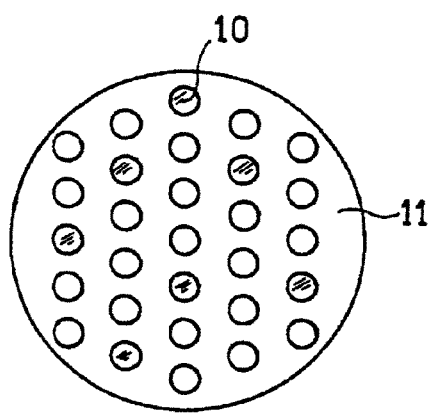
FIG. 1 A schematic front view of an example of the second ruggedness formed on the surface of the carbon material layer viewed from the side of the positive electrode.

A lithium primary battery includes: a positive electrode; a negative electrode including lithium or a lithium alloy; a separator disposed between the positive electrode and the negative electrode; a carbon material layer interposed between the negative electrode and the separator and adhering to the surface of the negative electrode; and a non-aqueous electrolyte. The carbon material layer suppresses the formation of a high-resistance coating film originating from components included in the non-aqueous electrolyte, and prevents effectively the increase in the resistance of the negative electrode at an initial period (before start of discharge or initial period of discharge).

In the present invention, an interface between the negative electrode and the carbon material layer, specifically the surface of the negative electrode at this interface has first ruggedness and the surface of the carbon material layer on the side of the separator has second ruggedness, and the first ruggedness and the second ruggedness correspond to each other. The carbon material layer adheres to the surface of the negative electrode with high strength by the formation of the first ruggedness corresponding to the second ruggedness at the interface between the negative electrode and the carbon material layer.

The adhesiveness of the carbon material layer to the surface of the negative electrode is hardly impaired even after the progress of the discharge to some extent. Thus, even after the progress of the discharge, it is possible to suppress the formation of a high-resistance coating film on the surface of the negative electrode and the increase in the resistance resulting therefrom. Consequently, even after the lithium primary battery is used to a certain degree and stored with the capacity of the battery remaining, the increase in the resistance of the negative electrode can be prevented, and the large-current discharge characteristics and the pulse discharge characteristics will not be impaired. That is, in the present invention, excellent large-current discharge characteristics and pulse discharge characteristics can be obtained at an initial period as well as after the progress of the discharge.

The surface area of the negative electrode is increased by the formation of the second ruggedness and the first ruggedness, which is advantageous for the electrode reaction. Also, by the fact that the first and second ruggedness correspond to each other, the thickness of the carbon material layer becomes uniform, and the resistance of the carbon material layer itself is decreased as compared to the case where there is no second ruggedness.

The negative electrode in which the carbon material layer having the second ruggedness on the surface of the side of the separator adheres to the surface of the negative electrode having the first ruggedness can be produced usually by disposing the carbon material layer on the surface of the negative electrode on the side of the separator, and pressing a surface of a pressing tool having ruggedness onto the surface of the negative electrode with the carbon material layer interposed therebetween. When the carbon material layer is pressed onto the surface of the negative electrode, the carbon material layer and the surface of the negative electrode deform, whereby the first ruggedness is formed on the surface of the negative electrode at the interface between the negative electrode and the carbon material layer, and at the same time, the second ruggedness is formed on the surface of the carbon material layer on the pressed side. Consequently, the carbon material layer pressed onto the surface of the negative electrode is embedded in concave portions on the surface of the negative electrode, and the carbon material layer tightly adheres to the surface of the negative electrode. That is, the carbon material layer adheres to the negative electrode along the ruggedness formed on the surface of the negative electrode by the pressing. Consequently, the first ruggedness and the second ruggedness are formed in corresponding positions and have roughly the same shape. It is to be noted that having roughly the same shape means not only that the concave portions and the convex portions of the respective first ruggedness and second ruggedness are formed into the same shapes but also includes the case of having slight difference in shapes and sizes.

Also, the first ruggedness and the second ruggedness correspond to the ruggedness of the pressing tool. Since the first and second ruggedness are formed by the pressing with the pressing tool, the concave portions of the first and second ruggedness have shapes corresponding to the convex portions of the pressing tool, and the convex portions of the first and second ruggedness have shapes corresponding to the concave portions of the pressing tool.

When the surface having the ruggedness of the pressing tool is pressed onto the surface of the negative electrode with the carbon material layer interposed therebetween, a newly formed surface of the negative electrode appears by the formation of the first ruggedness on the surface of the negative electrode, whereby the area of the negative electrode contributing to the electrode reaction increases. Further, since the carbon material layer adheres to the surface of the negative electrode along the first ruggedness concurrently with the formation of the first ruggedness, the newly formed surface of the negative electrode becomes protected with the carbon material layer concurrently with its appearance. Therefore, the newly formed surface of the negative electrode is maintained in an active condition without being exposed to unstable air or solvent.

Moreover, when the non-aqueous electrolyte is filled at the time of assembling the battery, a low-resistance coating film originating from the non-aqueous electrolyte is formed on the surface of the carbon material. Consequently, the formation of a high-resistance coating film due to the reaction between the surface of the negative electrode and the components included in the non-aqueous electrolyte is suppressed. Further, due to the contact of the non-aqueous electrolyte with the negative electrode, a part of lithium included in the negative electrode is absorbed in the carbon material layer. Consequently, favorable electron conductivity and ion conductivity can be ensured on the surface of the negative electrode. Therefore, the resistance of the negative electrode at an initial period can be reduced to a low level.

The first ruggedness and the second ruggedness formed corresponding to the ruggedness of the pressing tool usually have roughly the same shape. The shape of the ruggedness (for example, shape of convex portions (or concave portions) in front view from side of positive electrode) is not particularly limited, and examples thereof include dots, straight lines, curved lines, stripes, lattices, spirals, circles, ovals, and polygons. On the surface of the negative electrode on the side of the carbon material layer or on the surface of the carbon material layer on the side of the positive electrode, that is, on the side of the separator, one convex portion may be formed or two or more convex portions may be formed according to the shape and size of the convex portions. The two or more convex portions may be arranged regularly or irregularly.

When the shape of the ruggedness in the front view from the side of the positive electrode, specifically the shapes of the convex portions (or concave portions) are circles, ovals, polygons, etc., the convex portions (or concave portions) may be convex portions (or concave portions) of two or more similar figures having the same center or center of gravity. For example, two or more annular convex portions of similar figures may be arranged so as to have the same center or center of gravity. Preferable shapes of the convex portions or concave portions are circles. In particular, it is preferable that the convex portions and concave portions are arranged alternately and concentrically.

Figure 2:
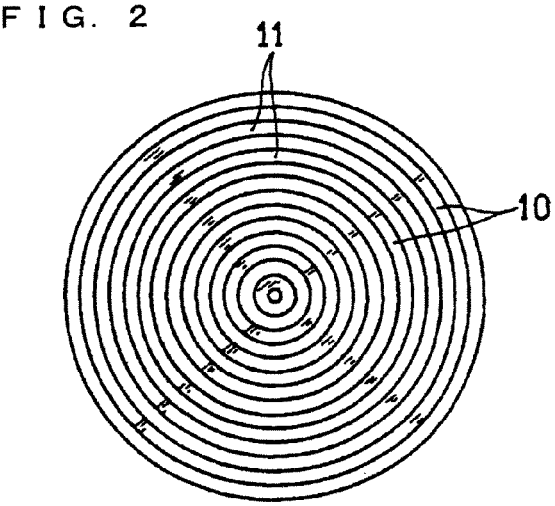
FIG. 2 A schematic front view of an example of the second ruggedness formed on the surface of the carbon material layer viewed from the side of the positive electrode.

FIGS. 1 and 2 each show a front view, from the side of the positive electrode, of a carbon material layer adhering to the surface of the negative electrode, which is an example of the shape of the second ruggedness. In FIG. 1, dotted convex portions 10 are formed at almost equal intervals on the surface of the carbon material layer. A concave portion 11 is formed in the periphery of the convex portions 10. In FIG. 2, concentric convex portions 10 are formed at almost equal intervals on the surface of the carbon material layer, and annular concave portions 11 are formed between the adjacent convex portions 10. It is to be noted that the first ruggedness formed on the surface of the negative electrode can be illustrated in the same manner as in FIGS. 1 and 2.

On the surface of the negative electrode at the interface between the negative electrode and the carbon material layer, and on the surface of the carbon material layer on the side of the separator, the location of the ruggedness is not particularly limited, and the ruggedness may be formed in a part of the area such as the center portion or periphery portion. In a preferred embodiment, the ruggedness is formed on the whole surface of the negative electrode on the side of the carbon material layer, and on the whole surface of the carbon material layer on the side of the separator. For example, the convex portions and the concave portions of the first ruggedness are formed alternately and concentrically on the whole surface of the negative electrode at the interface between the negative electrode and the carbon material layer, and the second ruggedness is formed on the whole surface of the carbon material layer on the side of the separator. Such an example is suitable in the case of using a disk-shaped negative electrode such as in a coin type lithium primary battery.

Alternatively, in the case of a cylindrical battery, etc., stripe-shaped ruggedness parallel to the lengthwise direction of the negative electrode may be formed, for example.

Considering that displacement is not likely to be produced when the carbon material layer is pressed onto the negative electrode, the depth of the concave portions of the first ruggedness (or second ruggedness on surface of carbon material layer) is, for example 10 to 400 μm, preferably 25 to 350 μm, more preferably 30 to 300 μm, particularly preferably 50 to 150 μm. In such ranges, the carbon material layer and the negative electrode can adhere to each other with higher adhesiveness. When the depth of the concave portions of the first ruggedness is 10 μm or more, the carbon material layer and the negative electrode can adhere to each other more effectively, and displacement of the carbon material layer can be prevented effectively. When the depth of the concave portions of the second ruggedness is 400 μm or less, deformation of the second ruggedness by pressure applied when the battery is sealed at the time of the assembly can be prevented more effectively. Consequently, unevenness in the battery characteristics can be suppressed more effectively.

The depth of the concave portions of the first ruggedness (or second ruggedness) is preferably half or less of the thickness of the negative electrode. The depth of the concave portions of the first ruggedness (or second ruggedness) is, for example 1 to 50%, preferably 3 to 35%, more preferably 5 to 15% relative to the thickness of the negative electrode.

The carbon material layer may be formed of a carbon material singly but preferably includes a carbon material and a binder.

Examples of the carbon material include graphite (natural graphite, artificial graphite, etc.), carbon black (acetylene black, ketjen black, channel black, furnace black, lump black, thermal black, etc.), and carbon fiber. These carbon materials can be used singly or in combination of two or more. Among the carbon materials, particulate carbon materials such as carbon black (particularly acetylene black), graphite, etc. are preferable in view of electron conductivity, porosity, lithium ion conductivity, etc. of the carbon material layer.

A particulate carbon material usually includes primary particles and secondary particles formed of aggregated primary particles. The primary particles of the carbon material preferably have an average particle diameter of 5 μm or less (e.g. 0.005 to 5 μm), particularly preferably 3 μm or less (e.g. 0.01 to 3 μm), or 1 μm or less (e.g. 0.01 to 1 μm).

On the carbon material layer, the weight per unit area of the carbon material is, for example 0.1 to 10 mg/cm$^2$, preferably 0.2 to 5 mg/cm$^2$, more preferably 0.3 to 1.5 mg/cm$^2$. Adjusting the weight of the carbon material as above is advantageous in the point of suppressing the reaction between the negative electrode and the components included in the non-aqueous electrolyte on the surface of the negative electrode, and ensuring more sufficient electron conductivity on the surface of the negative electrode. The weight of the carbon material in the above ranges is advantageous in the point of suppressing more sufficiently the reaction between the negative electrode and the components included in the non-aqueous electrolyte on the surface of the negative electrode, and ensuring sufficient electron conductivity on the surface of the negative electrode. Also, it is possible to prevent more effectively an excessive increase in the amount of liquid absorbed in the carbon material layer or an excessive increase in the density of the carbon material layer by the pressing that might impair sufficient ion conductivity.

The binder is not particularly limited as long as it is inactive to the carbon material, the negative electrode, the non-aqueous electrolyte, etc. If the binder is used, the carbon material layer can be formed more easily. Examples of the binder include fluorocarbon resins such as polyvinylidene fluoride and polytetrafluoroethylene; rubber-like polymers such as styrene-butadiene rubber (SBR) and modified acrylonitrile rubber; homopolymer or copolymer of (meth)acrylic acid such as polyacrylic acid, ethylene-acrylic acid copolymer, ethylene-methacrylic acid copolymer, ethylene-methyl acrylate copolymer, and styrene-acrylic acid copolymer; and vinyl cyanide resins such as acrylonitrile-styrene copolymer. Herein, the "(meth)acrylic acid" is meant to include acrylic acid and methacrylic acid.

These binders may be used singly or in combination of two or more. The binder may be used in the form of dispersion in which a binder is dispersed in a dispersing medium. Among the above binders, for example the polyacrylic acid can be easily dispersed in the dispersing medium without using a surfactant that may give a bad influence in the battery, and in addition, it is inexpensive. Therefore, it is advantageous in forming the carbon material layer.

The ratio of the binder is, for example 0.1 to 25 parts by weight, preferably 1 to 20 parts by weight, more preferably 3 to 15 parts by weight relative to 100 parts by weight of the carbon material.

The thickness of the carbon material layer is, for example 5 to 300 μm, preferably 10 to 100 μm, more preferably 30 to 80 μm. When the thickness of the carbon material layer is in such ranges, rupturing of the carbon material layer at the time of the pressing can be suppressed more effectively. Also, it is possible to prevent more effectively failure to form the first ruggedness, or deterioration in the adhesiveness at the interface between the carbon material layer and the negative electrode due to reduced depth of the concave portions, at the time of the pressing.

The carbon material layer may be formed directly on the surface of the negative electrode, and then may be pressed to form the first and second ruggedness. In a preferred embodiment, a sheet-shaped carbon material layer formed separately is disposed on the surface of the negative electrode, and then the first and second ruggedness are formed.

The carbon material layer can be formed by applying a paste including a carbon material onto the surface of the negative electrode or a substrate sheet, for example. The paste including a carbon material includes a binder, a thickener, and/or a dispersing medium, as necessary, in addition to the carbon material. The paste includes a carbon material, a binder, and a dispersing medium in many cases. When the paste is prepared by using a dispersing medium, the carbon material is dispersed uniformly in the paste. Therefore, the carbon material does not aggregate in the carbon material layer, and a uniform layer can be obtained. The formed coating film is usually dried to remove the dispersing medium, solvent, etc. included in the coating film.

Examples of the thickener include ethylene-vinyl alcohol copolymers and cellulose derivatives (carboxymethyl cellulose, methyl cellulose, etc.). The dispersing medium is not particularly limited as long as it does not react with the carbon material. However, one having high volatility or a low boiling point is preferable so as to be removed easily. Examples of such a dispersing medium include alcohol such as ethanol and isopropanol ($C_{1-3}$ alcohol, etc.); ether such as diethyl ether, dimethoxyethane, and tetrahydrofuran; ketone such as acetone; N-methyl-2-pyrrolidone (NMP); water; and mixture of these solvents.

The sheet-shaped carbon material layer can be formed by applying a paste including a carbon material on one surface of a substrate sheet to form a coating film, and drying the coating film as necessary. As the substrate sheet, a release sheet may be used. When the substrate sheet is a fiber sheet such as a non-woven cloth, the carbon material layer can be formed by making the fiber sheet to be impregnated with the paste, and drying the fiber sheet as necessary.

The formed carbon material layer may be released from the substrate sheet and may be disposed independently on the surface of the negative electrode. However, the carbon material layer has a low strength by itself. Therefore, it is preferable that the carbon material layer is disposed on the surface of the negative electrode together with the substrate sheet. In this case, the side of the carbon material layer is made to face the surface of the negative electrode.

Examples of the substrate sheet include a plastic sheet made of polyolefin such as polyethylene and polypropylene, and polystyrene; and a fiber sheet such as a woven cloth, non-woven cloth. The plastic sheet may be non-porous or porous depending on whether it is released from the carbon material layer or not after the pressing. For example, in the assembly of a coin type battery, in the case where the carbon material layer is pressed onto the negative electrode at the time of pressure bonding the negative electrode to the sealing plate, it is advantageous to select a substrate sheet that can be used without releasing, because detailed work of releasing the substrate sheet after the pressing will be unnecessary.

When the carbon material layer is disposed on the surface of the negative electrode together with the substrate sheet, followed by pressing to form the first and second ruggedness, and the battery is assembled, the substrate sheet is interposed between the separator and the carbon material layer. The substrate sheet and the carbon material layer may adhere to each other. Alternatively, in the case where the carbon material layer is transcribed on the surface of the negative electrode, the substrate sheet may be released from the carbon material layer after transcription.

A preferred substrate sheet is a fiber sheet. When the fiber sheet is used, high ion conductivity can be ensured on the surface of the carbon material layer even if the fiber sheet is not released from the carbon material layer after the pressing. Since the fiber sheet is disposed between the separator and the carbon material layer, the fiber sheet can retain the non-aqueous electrolyte and can supplement the function of the separator.

When the carbon material layer is formed by applying a paste including a carbon material onto a fiber sheet or making the fiber sheet to be impregnated with the paste, the carbon material layer and the fiber sheet becomes at least partly unified, and therefore they adhere effectively to each other. Consequently, at the time of assembling the battery, scattering of the powder of the carbon material can be suppressed effectively, which is advantageous in handling the carbon material layer.

In view of ion conductivity, etc., a nonwoven cloth is particularly preferable of the fiber sheet.

The fiber material of the fiber sheet can be selected suitably according to operating environment of the battery, etc. Examples of the fiber material include polyolefins such as polypropylene; polyphenylene sulfide; polyester resins such as polybutylene terephthalate; polyamide resins such as aramid; polyimide resins such as polyimide and polyamide imide; and polyether ether ketone. The fiber sheet may be of the same material as the separator used in the battery. The fiber sheet has a thickness of, for example 10 to 200 μm, preferably 50 to 150 μm.

If the nonwoven cloth is used, it can be released from the carbon material layer relatively easily even if it is released after the pressing.

The carbon material layer may be formed at least on a part of the surface of the negative electrode, or it may be formed so as to cover the whole surface of the negative electrode. For example, in a sheet-shaped or disk-shaped negative electrode, the carbon material layer may be formed on a part of one surface of the negative electrode, or the carbon material layer may be formed so as to cover the whole of one surface thereof. Alternatively, the carbon material layer may have a surface area that is larger than the surface area of the negative electrode.

In the case where the carbon material layer is formed on one surface of the sheet-shaped or disk-shaped negative electrode, when the area of the one surface is defined as 100%, the area of the carbon material layer is preferably 25 to 110%, more preferably 50 to 100%.

When the area of the carbon material layer is in the above ranges, it is possible to suppress more effectively the reaction of the negative electrode with the components included in the non-aqueous electrolyte to increase the resistance of the negative electrode. Further, it is advantageous in point of preventing absorption of unnecessarily large amount of non-aqueous electrolyte in the carbon material layer to decrease the ratio of the non-aqueous electrolyte contributing to the electrode reaction.

The negative electrode may include lithium and/or a lithium alloy as the negative electrode active material. Alternatively, a lithium layer or a lithium alloy layer may be formed on the surface of the negative current collector (copper, stainless steel, etc.). In a preferred embodiment, the negative electrode is composed of the negative electrode active material (e.g. lithium metal plate or lithium alloy plate) only.

As the lithium alloy, one generally used in the field of the batteries, for example an alloy including lithium as a matrix component and including a metal that can be alloyed with lithium, can be used. The metal other than lithium can be selected suitably according to desired physical properties and surface conditions of the negative electrode.

Example of the metal other than lithium include aluminum, tin, magnesium, indium, calcium, and manganese. These metals can be used singly or in combination of two or more. The content of the metal other than lithium in the lithium alloy is not particularly limited, and it is preferably 15 wt % or less (e.g. 0.1 to 15 wt %), more preferably 5 wt % or less (e.g. 0.2 to 5 wt %) relative to the total of lithium alloy. When the content of the metal other than lithium is in such ranges, it is possible to prevent more effectively an excessive increase in the melting point of the lithium alloy, or an excessive increase in the hardness thereof, or a decline in the processability thereof.

Examples of the preferred lithium alloy include a lithium-aluminum alloy (Li—Al alloy).

The shape of the negative electrode can be selected suitably according to the shape and size, standard performance, etc. of the lithium primary battery, and examples thereof include a sheet shape such as a strip shape, and a disk shape. The thickness of the negative electrode can be selected according to the depth of the concave portions of the first ruggedness in addition to the shape and size, standard performance, etc. of the lithium primary battery. It is, for example 0.1 to 3 mm, preferably about 0.2 to 2 mm.

For example, in the coin type lithium primary battery, the negative electrode has a disk shape having a diameter of about 5 to 25 mm and a thickness of about 0.2 to 2 mm.

The negative electrode may be cut or perforated in advance into the shape and size with which it is housed in the battery before the carbon material layer is disposed on its surface. Alternatively, the carbon material layer may be disposed on the surface of a sheet-shaped negative electrode and may be cut or perforated into an appropriate shape and size, such as a disk shape, concurrently with or after the pressing.

The positive electrode includes a positive electrode active material, and usually further includes a binder and a conductive material. As the positive electrode active material, those generally used in the field of the lithium primary batteries can be used. In particular, graphite fluoride and metal oxides such as manganese dioxide are preferable. Manganese dioxide is particularly preferable because it is a material having favorable discharge characteristics, and is inexpensive and relatively easy to be procured.

As the binder, one not causing chemical reaction in potential range during the charge and discharge of the positive electrode active material can be selected appropriately. As the binder, for example the binders given as examples in the paragraph of the carbon material layer can be used. The ratio of the binder is not particularly limited, and it is, for example 1 to 15 parts by weight, preferably 3 to 10 parts by weight relative to 100 parts by weight of the positive electrode active material.

As the conductive material, an electron conductor not causing chemical reaction in potential range during the charge and discharge of the positive electrode active material can be used. Examples thereof include graphite such as natural graphite and artificial graphite; carbon black; conductive fiber such as carbon fiber and metal fiber; and organic conductive material such as conductive polymer. The conductive material can be used singly or in combination of two or more.

The ratio of the conductive material is, for example 0.5 to 30 parts by weight, preferably 1 to 15 parts by weight relative to 100 parts by weight of the positive electrode active material.

The positive electrode can be obtained by pressure molding a paste or powdered mixture including a positive electrode active material, a binder, and a conductive material, into a desired shape by using a mold, etc. according to the shape and the like of the lithium primary battery. A thickener and/or dispersing medium given as examples in the paragraph of the carbon material layer can be added as necessary to the paste or powdered mixture.

The positive electrode has a sheet shape such as a strip shape, a disk shape, etc., according to the shape and the like of the lithium primary battery.

The separator is not particularly limited as long as it has a resistance to an environment in the lithium primary battery. For example, in addition to microporous film made of polyolefin, woven or nonwoven cloth can be given. Examples of the polyolefin included in the microporous film include polyethylene, polypropylene, and ethylene-propylene copolymer. As the resin constituting the woven or nonwoven cloth, the resins given as examples in the paragraph of the fiber sheet can be used. In particular, polyphenylene sulfide, polybutylene terephthalate, etc. are preferable in view of having excellent high-temperature resistance, solvent resistance, liquid retention properties, etc.

The thickness of the separator is, for example 20 to 250 μm, preferably 50 to 220 μm according to the shape or size of the lithium primary battery.

The non-aqueous electrolyte includes a non-aqueous solvent, and a lithium salt as a supporting electrolyte dissolved in the non-aqueous solvent. The non-aqueous electrolyte may further include an additive as necessary.

As the non-aqueous solvent, a solvent generally used in the field of the lithium primary batteries can be used without particular limitation.

Specific examples of the non-aqueous solvent include cyclic carbonates such as ethylene carbonate, vinylethylene carbonate, propylene carbonate, butylene carbonate, and vinylene carbonate; chain carbonates such as dimethyl carbonate, diethyl carbonate, and ethylmethyl carbonate; cyclic ether such as 1,4-dioxane, 1,3-dioxolane, dioxolane derivative, tetrahydrofuran and its derivative, 2-methyltetrahydrofuran, and 3-methyltetrahydrofuran; chain ether such as 1,2-dimethoxyethane, 1,2-diethoxyethane, trimethoxymethane, diethylene glycol dimethyl ether, and tetraglyme; lactones such as γ-butyrolactone and γ-valerolactone; sulfoxide compounds such as sulfolane, methylsulfolane, and dimethyl sulfoxide; amid compounds such as formamide, acetamide, and N,N-dimethyl formamide; nitroalkanes such as nitromethane; and nitrile compounds such as acetonitrile and propylnitrile.

The non-aqueous solvent can be used singly or in combination of two or more. Among these non-aqueous solvents, it is preferable to use at least propylene carbonate because it is stable in a wide temperature range and it dissolves a solute easily.

As the lithium salt, a material generally used in the field of the lithium primary batteries can be used. Specific examples of the lithium salt includes lithium salts of fluorine-containing acid imide [$LiN(CF_3SO_2)_2$, $LiN(C_2F_5SO_2)_2$, $LiN(CF_3SO_2)(C_4F_9SO_2)$, etc.], lithium salts of fluorine-containing acid ($LiPF_6$, $LiBF_4$, $LiCF_3SO_3$, etc.), lithium salts of fluorine-containing acid methide [lithium tris(trifluoromethane sulfonyl)methide ($LiC(CF_3SO_2)_3$, etc.], and lithium salts of chlorine-containing acid ($LiClO_4$, etc.).

These lithium salts can be used singly or in combination of two or more. Among these lithium salts, $LiClO_4$ is particularly preferable.

By combining propylene carbonate as the non-aqueous solvent and $LiClO_4$, the large-current discharge characteristics of the lithium primary battery can be further improved.

The concentration of the lithium salt is not particularly limited, and it is, for example 0.3 to 1.5 mol/L, preferably 0.7 or 1.2 mol/L. In such ranges, the decrease in the discharge characteristics and long-term storage characteristics at room temperature, and the increase in the viscosity and the decline in the ion conductivity of the non-aqueous electrolyte in a low-temperature environment (e.g. about −20° C.) can be suppressed more effectively.

Examples of the additive include carboxylic acid such as propionic acid, butyric acid, and valeric acid in addition to propane sultone and ethylene sulfide (ES). These additives can be used as necessary in order to suppress an excessive reaction of the positive electrode and/or the negative electrode.

The lithium primary battery can be produced, for example, by housing a positive electrode, a negative electrode having a carbon material layer adhering to a surface thereof, a separator interposed between the positive electrode and the negative electrode, and the non-aqueous electrolyte, in a battery case (e.g. positive electrode case and negative electrode case). The production method is not particularly limited, and a known method can be employed according to the shape, structure, use, or type of sealing of the battery. The shape of the lithium primary battery is not particularly limited, and it may be cylindrical, prismatic, etc. in addition to coin type. A preferable lithium primary battery is a coin type battery.

A method of producing a lithium primary battery of the present invention includes: a first step of disposing the carbon material layer onto a surface of the negative electrode on a side of the separator (i.e. surface on a side of positive electrode); and a second step of pressing a surface having ruggedness of a pressing tool onto a surface of the negative electrode with the carbon material layer interposed therebetween, thereby to form first ruggedness and second ruggedness corresponding to the ruggedness of the pressing tool, respectively, at an interface between the negative electrode and the carbon material layer (specifically on the surface of the negative electrode) at this interface, and on a surface of the carbon material layer on the side of the separator, and adhering the carbon material layer to the surface of the negative electrode.

In the first step, the carbon material layer may be disposed, as described above, by applying a paste including a carbon material directly onto the surface of the negative electrode and drying the paste. Alternatively, a sheet-shaped carbon material layer formed separately may be laid on the surface of the negative electrode.

In the case of forming the carbon material layer on one surface of a substrate sheet such as a fiber sheet, the carbon material layer is arranged in contact with the surface of the negative electrode in the first step.

In the second step, by pressing the carbon material layer and the surface of the negative electrode with the surface having ruggedness of the pressing tool, the first ruggedness is formed on the surface of the negative electrode at the interface between the negative electrode and the carbon material layer, the carbon material layer adheres (or is bonded) to the surface of the negative electrode, and the second ruggedness is formed on a surface of the carbon material layer on the pressed side. Specifically, in the second step, by pressing the surface having the ruggedness of the pressing tool onto the surface of the negative electrode with the carbon material layer interposed therebetween, the surface of the negative electrode and the carbon material layer are deformed to form the first ruggedness on the surface of the negative electrode. At the same time, the carbon material layer adheres to the negative electrode along the first ruggedness to form the second ruggedness on the surface of the carbon material layer. In the case where the carbon material layer is formed on one surface of the substrate sheet, the carbon material layer and the negative electrode are pressed from the side of the substrate sheet with the carbon material layer in contact with the surface of the negative electrode. In this case, it is advantageous because adhesion of the carbon material to the pressing tool can be prevented.

The pressure of the pressing is, for example 0.1 to 10 MPa, preferably 0.1 to 5 MPa, more preferably 0.1 to 3 MPa. However, there is no particular limitation thereto and it is allowable as long as the negative electrode and the carbon material layer can be pressed until they have a predetermined thickness.

In the case of the coin type battery, the second step can be performed concurrently with pressure bonding the negative electrode to the sealing plate. That is, the negative electrode with the carbon material layer disposed on one surface thereof is disposed such that the surface of the side opposite to the carbon material layer is in contact with the inner side of the sealing plate, and the carbon material layer is pressed with the pressing tool. Thus, the negative electrode may adhere to the sealing plate concurrently with the formation of the first and second ruggedness.

The carbon material layer and the negative electrode can be cut or perforated into a desired shape and size at an appropriate stage. For example, both of the carbon material layer and the negative electrode may be cut into a desired shape and size before the first step. Alternatively, in the first step, after the carbon material layer is disposed on the surface of the negative electrode, the carbon material layer may be cut or perforated singly or together with the negative electrode.

Otherwise, in the second step, the carbon material layer may be cut or perforated singly or together with the negative electrode concurrently with the pressing or after the pressing.

Figure 3:
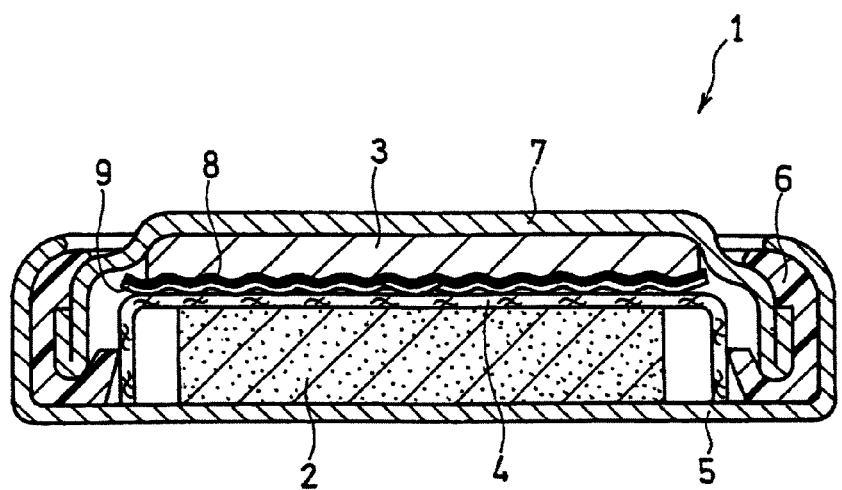
FIG. 3 A vertical sectional view schematically illustrating an example of the lithium primary battery of the present invention.

FIG. 3 is a schematic sectional view of a coin type lithium primary battery as an example of the lithium primary battery of the present invention. A coin type lithium primary battery 1 has a disk-shaped positive electrode 2, a disk-shaped negative electrode 3, a separator 4 interposed between the positive electrode 2 and the negative electrode 3, and a non-aqueous electrolyte that is not illustrated in the drawing.

The positive electrode 2 is housed in the positive electrode case 5 such that the positive electrode 2 is in contact with an inner bottom surface of the positive electrode case 5. A gasket 6 made of resin that is injection molded into a ring shape is disposed from an opening portion to an inner wall of the positive electrode case 5.

An opening upper end portion of the positive electrode case 5 is bent inward with the gasket 6 interposed between thereof and a sealing plate (negative electrode case) 7 to which the negative electrode 3 is pressure bonded on an inner side thereof. In the lithium primary battery 1, the positive electrode 2 and the negative electrode 3 are insulated from each other by the separator 4.

The positive electrode case 5 also serves as a positive current collector and a positive terminal, and the negative electrode case 7 also serves as a negative current collector and a negative terminal.

In the present invention, as illustrated in FIG. 3, a carbon material layer 8 adheres to the surface of the negative electrode 3, a fiber sheet 9 is interposed between the carbon material layer 8 and the separator 4, and the fiber sheet 9 adheres to the carbon material layer 8. First ruggedness is formed on the surface of the negative electrode 3 at an interface between the negative electrode 3 and the carbon material layer 8. Second ruggedness having roughly the same shape as the first ruggedness is formed on the surface of the carbon material layer 8 on the side of the separator.

Such ruggedness is formed by laying, on the surface of the negative electrode 3, the carbon material layer 8 formed on the surface of the fiber sheet 9 in contact with the negative electrode 3, and pressing the surface having ruggedness of the pressing tool from the side of the fiber sheet 9. Therefore, both of the first and second ruggedness correspond to the ruggedness of the pressing tool.

The negative electrode 3 and the carbon material layer 8 adhere to each other with high adhesive strength due to the formation of the first and second ruggedness. Consequently, the reaction of the negative electrode with the components included in the non-aqueous electrolyte on the surface of the negative electrode can be suppressed. Also, the formation of a high-resistance coating film can be suppressed, and therefore the resistance of the negative electrode at an initial period can be suppressed to a low level. Further, since the adhesiveness between the negative electrode and the carbon material layer is maintained even after the progress of the discharge to same extent, the increase in the resistance of the negative electrode can be suppressed. Even in the case where manganese dioxide having higher solubility with the progress of the discharge is used as the positive electrode active material, the formation of a high-resistance coating film originating from manganese ions on the surface of the negative electrode can be prevented effectively. Therefore, even after the progress of the discharge to some extent, the decrease in the large-current discharge characteristics and the pulse discharge characteristics can be suppressed.

The material for the positive electrode case and the negative electrode case is not particularly limited as long as it is a material generally used in the field of the lithium primary battery. For example, the positive electrode case and the negative electrode case can be formed of stainless steel, etc.

The gasket is used for insulating the positive electrode case from the negative electrode case, and hermetically enclosing the battery. Examples of the material for the gasket include heat-resistant resin materials such as polypropylene, polyphenylene sulfide, and polyether ether ketone.

EXAMPLES

Examples of the present invention will be described in detail in the following. However, the present invention is not limited to these examples.

Example 1

A coin type lithium primary battery of FIG. 3 was produced in the following manner.
(1) Production of Carbon Material Layer Ethanol was added to a powder of acetylene black (Denka black, available from Denki Kagaku Kogyo K.K., average particle diameter of primary particles: 35 nm) as the carbon material, and mixed sufficiently. Further, water and polyacrylic acid as a binder (10 parts by weight relative to 100 parts by weight of acetylene black) were added to the mixture and mixed sufficiently, thereby obtaining a mixture in a paste form. A predetermined amount of the obtained paste was applied onto a nonwoven cloth made of polypropylene (thickness: 80 μm), and this was vacuum dried at 25° C. for a day and was perforated into a circle of Φ15.0 mm, thereby producing a composite component having a nonwoven cloth 9 and a carbon material layer 8 formed thereon.

The weight of the carbon material per unit area of the carbon material layer was determined by subtracting the weight of the nonwoven cloth and polyacrylic acid from the weight of the composite component, and then dividing the obtained value by the area of the composite component, and it was 0.8 mg/cm². The thickness of the carbon material layer was 50 μm.
(2) Production of Positive Electrode Manganese dioxide ($MnO_2$) was used as the positive electrode active material, ketjen black was used as the conductive material, and a fluorocarbon resin (polytetrafluoroethylene (Neofron, available from Daikin Industries, Ltd.) was used as the binder. The positive electrode active material, the conductive material, and the binder were mixed in a weight ratio of 100:3:6, thereby to prepare a positive electrode paste. The obtained positive electrode paste was dried at 70° C., and subsequently pressure molded by using a predetermined mold and a hydraulic press machine, thereby producing a disk-shaped pellet having a diameter of 14 mm and a thickness of 1.9 mm. This pellet was dried at 200° C. for 12 hours, thereby to obtain a positive electrode 2.
(3) Production of Negative Electrode A predetermined amount of a disk-shaped block lithium negative electrode 3 (diameter: 13 mm, thickness: 0.9 mm) was mounted in the center inside a negative electrode case 7 with a gasket 6 disposed in the periphery thereof, as illustrated in FIG. 3. The composite component obtained in (1) was mounted on the surface of the negative electrode 3 so that the center thereof overlapped roughly the center of the negative electrode case. At this time, in the composite component, the carbon material layer 8 was brought in contact with the negative electrode 3.

A pressing tool (metal bar having diameter of 15 mm, length of 10 cm) having, on its surface, ruggedness formed of 15 ring-shaped convex portions having a height of 30 μm arranged concentrically at intervals of adjacent convex portions of 0.5 mm, was prepared. The surface having ruggedness of this pressing tool was applied to the composite component from the side of the nonwoven cloth 9, such that the center of the concentric circles roughly overlaps the center of the composite component, and a pressure of 3 MPa was applied perpendicular to the negative electrode 3 until the carbon material layer had a predetermined thickness.

By the pressing, the composite component adhered to the negative electrode 3, and the negative electrode 3 was pressure bonded to the negative electrode case 7. Ruggedness is formed on the surface of the negative electrode 3 at an interface between the negative electrode 3 and the carbon material layer 8, and on the surface of the carbon material layer 8. When the cross section of the ruggedness was confirmed, the depth of the concave portions of the ruggedness was roughly the same as the height of the convex portions of the pressing tool.

The production of the negative electrode was performed in a dry air having a dew point of −50° C. or less.
(4) Production of Lithium Primary Battery The positive electrode 2 was mounted in the center of an inner bottom surface of a positive electrode case 5, and then a separator 4 composed of a nonwoven cloth made of polypropylene was laid on the surface of the positive electrode 2. Further, a non-aqueous electrolyte was injected into the positive electrode case 5. Thereafter, an opening portion of the positive electrode case 5 was closed with the negative electrode case 7 to which the negative electrode 3 was pressure bonded, which was obtained in (3), thereby producing a coin type lithium primary battery (CR2032) (battery 1) having a diameter of 20 mm and a thickness of 3.2 mm.

As the non-aqueous electrolyte, an electrolyte prepared by dissolving lithium perchlorate at a concentration of 1 mol/L in a mixed solvent including propylene carbonate and 1,2-dimethoxyethane in a volume ratio of 1:1 was used.

The production of the lithium primary battery was performed in a dry air having a dew point of −50° C. or less.

Examples 2 and 3

A negative electrode 3 with a composite component adhering to a surface thereof was produced in the same manner as in Example 1 except that a pressing tool having convex portions of different heights was used. The heights of the convex portions on the surface of the pressing tool are shown in Table 1.

Lithium primary batteries (batteries 2 and 3) were produced in the same manner as in Example 1 except for using the obtained negative electrode.

Example 4

A composite component was produced in the same manner as in Example 2 except for using a powder of carbon black (trade name: Carbon ECP, average particle diameter of primary particles: 39.5 nm, available from Lion Co., Ltd.) in place of the powder of acetylene black.

A lithium primary battery (battery 4) was produced in the same manner as in Example 1 except for using the obtained composite component.

Example 5

A composite component was produced in the same manner as in Example 2 except for using a powder of artificial graphite (high-purity graphite, average particle diameter: 3 μm, specific surface area: 12.8 m²/g) in place of the powder of acetylene black.

A lithium primary battery (battery 5) was produced in the same manner as in Example 1 except for using the obtained composite component.

Comparative Example 1

A predetermined amount of a disk-shaped block lithium negative electrode 3 was mounted in the center of a negative electrode case 7 with a gasket 6 disposed in the periphery thereof, and it was pressure bonded to the negative electrode case 7. A lithium primary battery (battery 6) was produced in the same manner as in Example 1 except for using the negative electrode case 7 to which the negative electrode 3 was pressure bonded, and disposing the composite component between the negative electrode 3 and the separator without pressing the composite component onto the negative electrode.

Comparative Example 2

A negative electrode having a nonwoven cloth adhering to a surface thereof was produced in the same manner as in Example 2 except for using no carbon material layer, that is, using only the nonwoven cloth made of polypropylene used for the composite component 7 in place of the composite component 7.

A lithium primary battery (battery 7) was produced in the same manner as in Example 1 except for using the obtained negative electrode.

(5) Evaluation of Batteries
(A) Evaluation of Large-Current Discharge Characteristics (−20° C.) at Initial Period By using the batteries 1 to 7 obtained in Examples and Comparative Examples, each battery immediately after production was subjected to a preliminary discharge at a constant current of 4 mA for 30 minutes. Further, each battery was aged at 60° C. for a day and large-current discharge characteristics in a low-temperature environment of −20° C. were evaluated. Specifically, a closed circuit voltage at the time of performing a constant current pulse discharge at 30 mA for a second was measured.

(B) Evaluation of Large-Current Discharge Characteristics after Progress of Discharge (−20° C.)

By using the batteries 1 to 7 obtained in Examples and Comparative Examples, each battery immediately after the production was subjected to a preliminary discharge at a constant current of 4 mA for 30 minutes. Next, each battery was aged at 60° C. for a day, and then discharged at a constant current of 0.1 mA in an environment of 25° C. for 1,000 hours to advance the discharge. Further, each battery was stored at 25° C. for a day, and large-current discharge characteristics in a low-temperature environment of −20° C. were evaluated. Specifically, a closed circuit voltage at the time of performing a constant current pulse discharge at 30 mA for a second was measured.

Evaluation results are shown in Table 1. In Table 1, each value of closed circuit voltage at the time of pulse discharge shows an average value of three batteries.

TABLE 1

| | | Height of convex portions of pressing tool (μm) | Closed circuit voltage (V) | |
|---|---|---|---|---|
| | Carbon material | | Initial period | After progress of discharge |
| Example 1 | Acetylene black | 30 | 2.15 | 1.74 |
| Example 2 | Acetylene black | 100 | 2.18 | 1.76 |
| Example 3 | Acetylene black | 300 | 2.17 | 1.73 |
| Example 4 | ECP | 100 | 2.16 | 1.73 |
| Example 5 | Graphite | 100 | 2.18 | 1.72 |
| Co. Ex. 1 | Acetylene black | No pressing onto carbon material layer | 2.14 | 1.60 |
| Co. Ex. 2 | None | 100 | 1.92 | 1.36 |

From the results of Table 1, it was found that the batteries of Examples 1 to 5 had a high closed circuit voltage at an initial period as well as after the progress of the discharge as compared with the batteries of Comparative Examples 1 and 2.

At an initial period, in addition to Examples, a high closed circuit voltage was obtained in Comparative Example 1 as compared with Comparative Example 2. The reason for this is considered that, in Examples, since the carbon material layer adhered to the surface of the surface of the negative electrode by the pressing, an active surface of the negative electrode was protected. Further, high electron conductivity and ion conductivity were considered to be ensured on the surface of the negative electrode by a low-resistance coating film formed on the surface of the carbon material due to contact with the non-aqueous electrolyte.

In Comparative Example 1, although the carbon material layer was only mounted on the separator, the carbon material layer was considered to adhere to the surface of the negative electrode to some extent because pressure was applied between each constituent in the battery by the assembly of the battery. In contrast, in Comparative Example 2, it is considered that, since there was no carbon material layer, the negative electrode reacted excessively with the components included in the non-aqueous electrolyte on the surface of the negative electrode to form a coating film increasing the resistance, thereby lowering the closed circuit voltage.

After the progress of the discharge, the batteries of Examples had a high closed circuit voltage as compared with any of the batteries of Comparative Examples 1 and 2.

In lithium primary batteries using manganese dioxide as the positive electrode active material, in general, with the progress of the discharge, manganese ions eluting from the positive electrode react with the surface of the negative electrode, and the reaction product thereof is deposited, thereby increasing the resistance of the negative electrode. However, in the batteries of Examples, since the carbon material layer adheres to the surface of the negative electrode by the pressing, the adhesiveness does not be impaired even after the progress of the discharge. Consequently, it is considered that, even after the progress of the discharge, the surface of the negative electrode is favorably protected by the carbon material layer, and the reaction of the negative electrode with manganese ions originating from the positive electrode on the surface of the negative electrode is suppressed effectively. It is considered that, for this reason, a high closed circuit voltage was obtained even after the progress of the discharge in Examples.

In contrast, in Comparative Example 1, a closed circuit voltage was lower than in Examples. The reason for this is considered that, in Comparative Example 1, since the carbon material layer was only in contact with the negative electrode, the adhesiveness of the carbon material layer to the negative electrode decreased with the progress of the discharge, and therefore the suppression of the reaction of the negative electrode with the manganese ions originating from the positive electrode was insufficient.

In Comparative Example 2, it is considered that, since there was no carbon material layer itself, the manganese ions eluting from the positive electrode reacted with the negative electrode with the progress of the discharge, and the reaction product thereof deposited on the surface of the negative electrode, thereby significantly increasing the resistance of the negative electrode.

It is to be noted that, although in the present invention, lithium metal was used in the negative electrode as Examples, similar effects can be obtained if a lithium alloy is used in the negative electrode.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

The lithium primary battery of the present invention has excellent large-current discharge characteristics in a low-temperature environment not only at an initial period but also after the progress of the discharge. Therefore, it is effective in uses such as active tags and keyless entry operating in a low-temperature environment.

REFERENCE SIGNS LIST

1. Lithium primary battery
2. Positive electrode
3. Negative electrode
4. Separator
5. Positive electrode case
6. Gasket
7. Negative electrode case
8. Carbon material layer
9. Fiber sheet
10. Convex portion
11. Concave portion

The invention claimed is:

1. A lithium primary battery comprising:
   a positive electrode;
   a negative electrode including lithium or a lithium alloy;
   a separator disposed between the positive electrode and the negative electrode;
   a carbon material layer interposed between the negative electrode and the separator; and
   a non-aqueous electrolyte, wherein:
   a surface of the negative electrode on a side of the carbon material layer has first ruggedness and adheres to a surface of the carbon material layer on a side of the negative electrode,
   a surface of the carbon material layer on a side of the separator has second ruggedness,
   the first ruggedness and the second ruggedness correspond to each other,
   the first ruggedness and the second ruggedness are ruggedness formed by pressing the carbon material layer onto the surface of the negative electrode to deform the carbon material layer and the surface of the negative electrode, and
   the separator does not have same ruggedness as the first ruggedness and the second ruggedness.

2. The lithium primary battery in accordance with claim 1, wherein:
   convex portions and concave portions of the first ruggedness are formed alternately and concentrically on the whole surface of the negative electrode, and
   the second ruggedness are formed on the whole surface of the carbon material layer on the side of the separator.

3. The lithium primary battery in accordance with claim 1, wherein the carbon material layer includes a carbon material and a binder.

4. The lithium primary battery in accordance with claim 1, wherein the carbon material is at least one selected from carbon black and graphite.

5. The lithium primary battery in accordance with claim 3, wherein the binder includes polyacrylic acid.

6. The lithium primary battery in accordance with claim 1, further comprising a fiber sheet interposed between the separator and the carbon material layer, the fiber sheet adhering to the carbon material layer.

7. The lithium primary battery in accordance with claim 6, wherein the fiber sheet is a nonwoven cloth.

8. The lithium primary battery in accordance with claim 1, wherein the positive electrode includes manganese dioxide as an active material.

9. The lithium primary battery in accordance with claim 1, wherein the non-aqueous electrolyte includes propylene carbonate and $LiClO_4$.

10. The lithium primary battery in accordance with claim 1, wherein the negative electrode has a thickness of 0.1 to 3 mm.

11. The lithium primary battery in accordance with claim 1, wherein the carbon material layer has a thickness of 5 to 300 µm.

12. The lithium primary battery in accordance with claim 1, wherein the concave portions of the first ruggedness have a depth of 10 to 400 µm, which is half or less of the thickness of the negative electrode.

13. The lithium primary battery in accordance with claim 12, wherein the concave portions of the first ruggedness have a depth of 25 to 350 μm.

14. The lithium primary battery in accordance with claim 1, which is a coin type battery.

15. A method of producing a lithium primary battery comprising: a positive electrode; a negative electrode including lithium or a lithium alloy; a separator disposed between the positive electrode and the negative electrode; a carbon material layer interposed between the negative electrode and the separator; and a non-aqueous electrolyte, the method comprising:
- a first step of disposing the carbon material layer on a surface of the negative electrode on a side of the separator; and
- a second step of, by using a pressing tool having a surface having ruggedness, pressing the surface having ruggedness onto the surface of the negative electrode with the carbon material layer interposed therebetween, thereby forming first ruggedness and second ruggedness corresponding to the ruggedness of the pressing tool, respectively, on the surface of the negative electrode and the surface of the carbon material layer on the side of the separator, and allowing the carbon material layer to adhere to the surface of the negative electrode,
wherein the separator does not have same ruggedness as the first ruggedness and the second ruggedness.

16. The method of producing the lithium primary battery in accordance with claim 15, wherein:
- the carbon material layer is formed on one surface of a fiber sheet, and
- in the first step, the carbon material layer is disposed in contact with the surface of the negative electrode.

17. The lithium primary battery in accordance with claim 1, wherein the positive electrode is a disk-shaped pellet pressure-molded using a mold.

18. The method of producing the lithium primary battery in accordance with claim 15, wherein the positive electrode is a disk-shaped pellet pressure-molded using a mold.

* * * * *